Dec. 22, 1964 M. O. MARMORINE ET AL 3,162,459
FOLDING FRAME FOR FARM IMPLEMENTS
Filed Nov. 15, 1962 7 Sheets-Sheet 4

INVENTORS
MARVIN O. MARMORINE
BY LEWIS E. LAWSON

Moore, White & Burd
ATTORNEYS

Dec. 22, 1964  M. O. MARMORINE ET AL  3,162,459
FOLDING FRAME FOR FARM IMPLEMENTS
Filed Nov. 15, 1962  7 Sheets-Sheet 6

INVENTORS
MARVIN O. MARMORINE
BY LEWIS E. LAWSON
Moore, White & Burd
ATTORNEYS

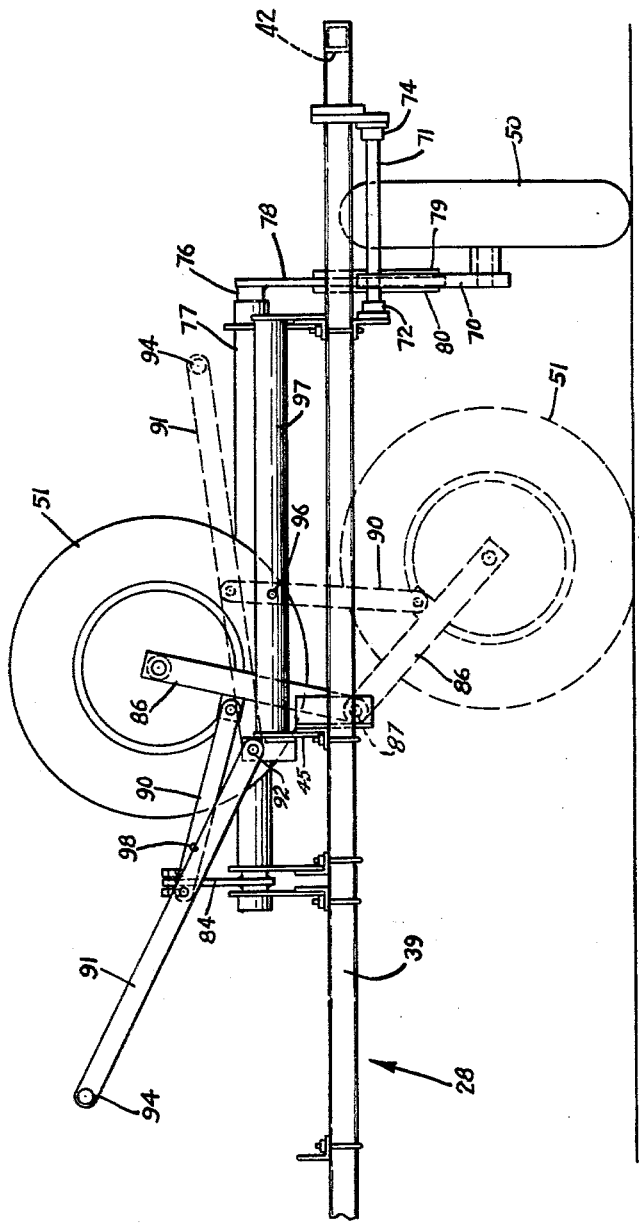

United States Patent Office 3,162,459
Patented Dec. 22, 1964

3,162,459
FOLDING FRAME FOR FARM IMPLEMENTS
Marvin O. Marmorine and Lewis E. Lawson, Le Sueur, Minn., assignors to Green Giant Company, Le Sueur, Minn., a corporation of Minnesota
Filed Nov. 15, 1962, Ser. No. 237,829
5 Claims. (Cl. 280—34)

This invention is a framework for agricultural implements such as cultivators, planters and the like and is novel in having a central section coupled with two pivoting outboard sections which pivot about a vertical axis near the rear center of the center section to align themselves behind the center section and provide a frame that is of a width suitable for transport on highways while retaining extraordinary width for use in the fields. The structure is novel in that the folding is accomplished without lifting any of the sections of the device and all of the work is accomplished by the tractor or other vehicle used to pull the mechanism. The device is also novel in that it retains transverse flexibility with respect to a field in which it is operating in spite of its substantial width. The device is further novel in that both sections pivot about the same vertical axis thereby producing a very simple and effective structure for the purposes indicated.

Accordingly, it is a principal object of this invention to provide a novel folding frame structure for supporting agricultural implements.

It is a further object of this invention to provide a folding frame structure for agricultural implements that folds by pivoting outward sections about a vertical axis at the rear center of a central section.

Yet another object of this invention is to provide an extremely simple folding frame for supporting agricultural implements.

It is a still further object of this invention to provide a folding frame for agricultural implements that remains flexible across its breadth when in a functioning or working position and longitudinally when in a transport position.

It is a still further object of this invention to provide a folding framework for supporting agricultural implements which may be arranged in transport position with a minimum of manual effort.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 8 is a front elevation of structure shown in FIGURE 6 taken on the line and in the direction of the arrows 8—8 of FIGURE 6; it is drawn to the same scale as FIGURES 3, 4, 5 and 6, and broken lines show hidden and adjusted positions of parts.

Figure 1:
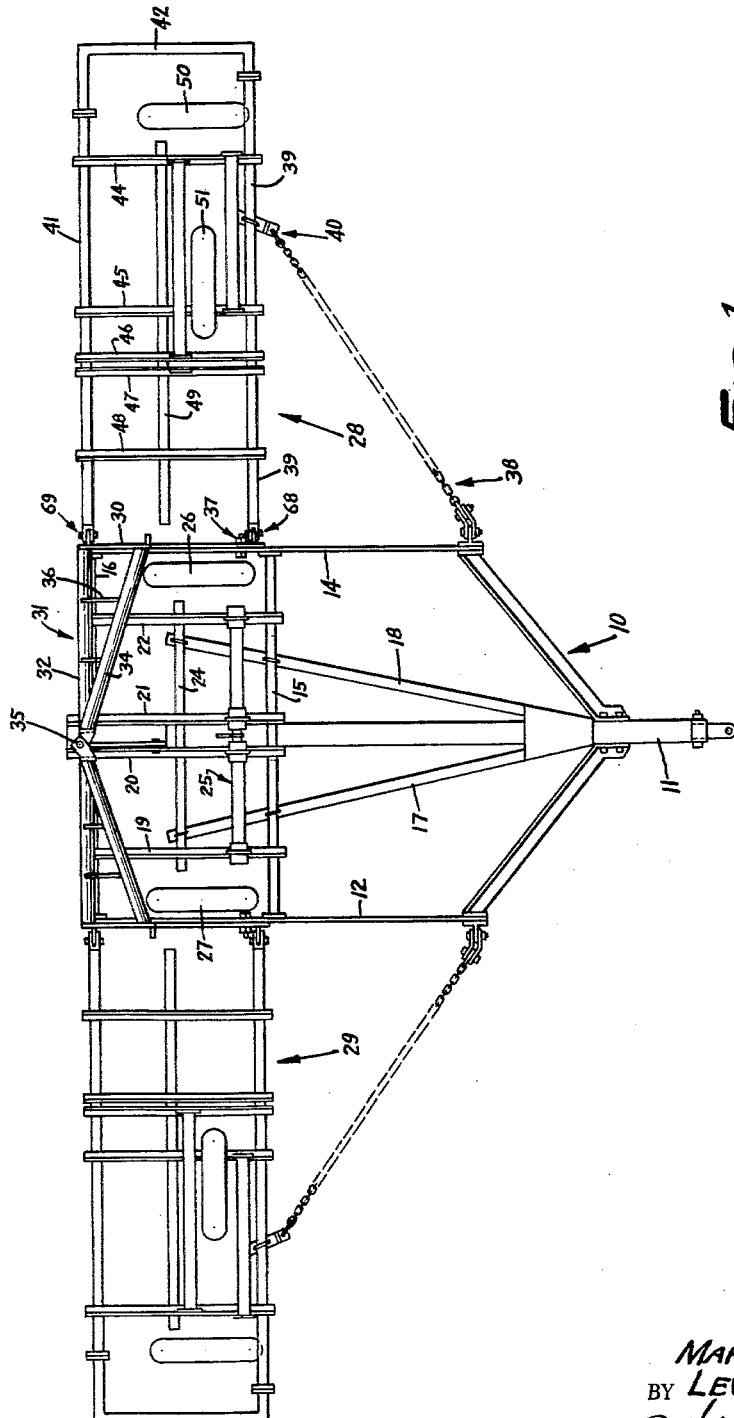
FIGURE 1 is a plan view; broken lines illustrate the position of some repetitive elements.

Referring to the drawings and specifically to FIGURE 1, the device is provided with a central frame member generally designated 10 which includes the usual tongue 11, side frame members 12 and 14, transverse frame members 15 and 16, and diagonal frame members 17 and 18. In addition, there are the frame members 19, 20, 21 and 22 which are interconnected by transverse frame member 24. These frame members are tied in with the diagonal frame members 17 and 18 and provide the support for the control mechanism indicated generally at 25, for the wheels 26 and 27, and the implements carried by the central section. At the scale drawn in FIGURE 1, only the general location of the control mechanism and the wheels are shown. This structure will be shown and discussed in more detail in connection with FIGURES 3, 4 and 5 where the scale is larger and the parts can be shown without confusion.

At each side of central frame member 10 are shown the flanking or wing frame members generally designated 28 and 29. As the two frame members have completely corresponding parts, although not identical since they are reversed for positioning on opposite sides of the central frame member 10, only the righthand one, 28, in FIGURE 1, will be described in detail.

The inner end of frame member 28 is formed of a plate 30 which is secured rigidly to a subframe structure 31. This sub or pivoting frame structure has two major elements suitably formed, from tubular steel for example, designated 32 and 34. They are arranged with respect to each other so that their ends adjacent frame 30 are spaced longitudinally in the direction of movement of the frame when in use and their ends nearer the center of the frame 10 are spaced vertically in order to provide a stable pivot point on the vertical pivot member 35. Suitable bracing extends between these two members as for example at 36.

Plate 30 may be secured to side member 14 near the leading edge of flanking frame 28 by some suitable means such as the nut and bolt assembly 37. Additional resistance to rearward pivoting movement about the pivot point 35 is provided by a tension means such as chain 38 which is secured near the forward end of side frame 14 and to an intermediate point on the front frame member 39 of frame structure 28 but nearer its outboard than inboard ends. Suitable means such as a clevis or the like is provided at 40 for the disconnection of the chain when it is desired to pivot the wing section 28 about pivot point 35 to place it in a rearward projection of one-half of frame 10.

Parallel to frame member 39 is a rear frame member 41 which is interconnected with the former suitably as by the end piece 42 and a plurality of transverse members 44, 45, 46, 47 and 48. For at least some uses of the frame, an additional transverse frame member 49 is secured to the braces extending between the members 39 and 41 to provide additional space on which to secure agricultural implements.

A wheel 50 is positioned so as to be turning on an axis approximately parallel to wheels 26 and 27 with the frame portion 28 positioned as shown in FIGURE 1. This wheel may be controlled as to vertical position by structure which is shown in detail in FIGURES 6 and 7. A wheel 51 is positioned to rotate about an axis at right angles to wheel 50 and it may be mechanically and manually raised and lowered by means of structure illustrated and described in detail in connection with FIGURES 6 and 7.

Comparison of the flanking frame assemblies 28 and 29 will disclose that the latter has portions substantially equivalent to all of those shown and discussed with respect to frame member 28.

Figure 2:
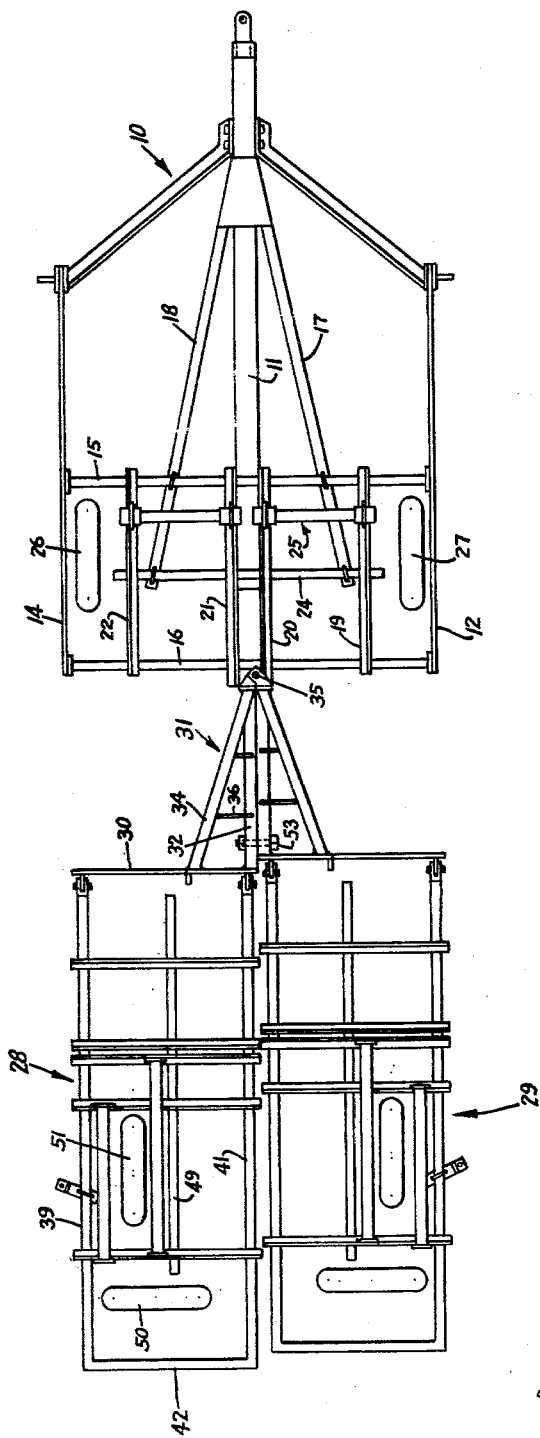
FIGURE 2 is a plan view in adjusted position.

In FIGURE 2, the device is shown folded for transport into and out of narrow gateways in fences around fields and on highways. The chain member 38 and the nut and bolt assembly 37 and their counterparts for wing section 29 have been disconnected which then leaves the wing members 28 and 29 free to pivot about the pivot point 35. Although it cannot be observed in this figure, the wheel 51 has been lowered and the wheel 50 elevated and their counterparts on wing frame 29 similarly positioned, so that the wing members 28 and 29 are supported by the pivot point 35 and the wheels so placed as to allow them to track behind central section 10. With the two wing or flanking sections 28 and 29 folded as shown in FIGURE 2, it will be seen that they constitute a rearward projection of the main or central frame member 10. Preferably each of the wing members measures about one-half of the measurement of central frame 10 from side to side, front to back in FIGURE 1. However, some departure from this dimensional relationship may be made without departing from the spirit of the invention. Furthermore, since the wing members are connected to section 10 only at the pivot point 35, they will trail behind the section 10 in the same manner that it in turn will trail behind a towing vehicle. Pivot point 35 may be offset slightly to one side of center of central frame 10 viewed from the rear to accommodate specific implements. In this folded position, the entire structure may be readily taken through gates and fences and towed along the highway. A suitable clamping means such as the nut and bolt assembly 53 holds the wing sections together for transport.

Figure 3:
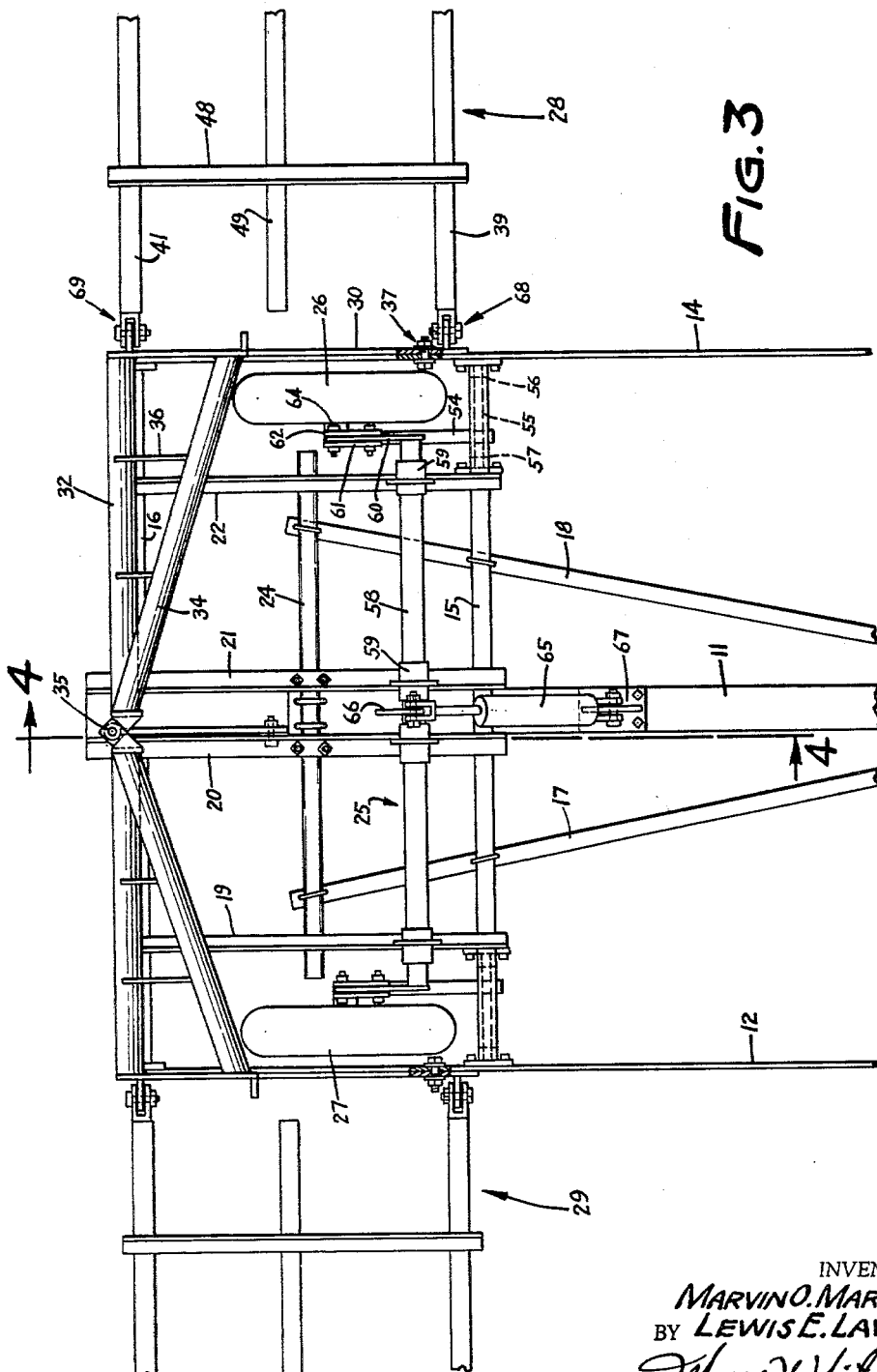
FIGURE 3 is an enlarged fragmentary plan view illustrating details of the construction of the center portion; broken lines illustrate hidden parts.
Figure 5:
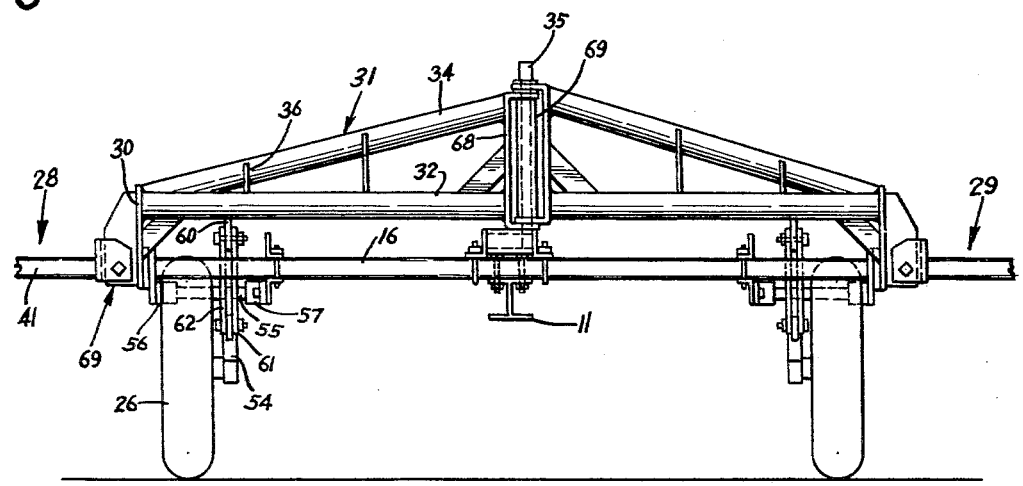
FIGURE 5 is a rear elevation taken on the line and in the direction of the arrows 5—5 of FIGURE 4 and drawn to the same scale as that figure; broken lines illustrate hidden parts.

In FIGURE 3, it may be seen that the wheel 26 is supported by an arm 54 which is rigidly secured to a shaft 55, shown only in broken lines, that in turn is supported in the bearing members 56 and 57. These bearing members as shown clearly in FIGURE 5 are supported by members 14 and 22 respectively.

The control structure, generally designated 25, consists of a tube or shaft 58 which is pivotally supported suitably as by bearings 59. Lever 60 is secured rigidly to tube 58 and articulated to wheel 54 by means of the links 61 and 62. Any suitable means such as the nut and bolt assemblies 64 secure the links 62 to the arm 60 and to a bracket provided on arm 54. Wheel 27 is provided with similar structure. A suitable power means such as the extending and contracting fluid cylinder 65 is pivoted to a lever 66 that in turn is secured to shaft 58. Cylinder 65 is also anchored to tongue 11 as at 67. When fluid under pressure is applied to cylinder 65 so as to cause it to extend, the wheels 26 and 27 are moved downwardly, the reverse motion or contraction of cylinder 65 raises the wheels and thereby lowers the frame 10.

In this view also can be seen clearly how the wing frame 28, members 41 and 39 are pivotally or hingedly secured to the member 30 as seen at 68 and 69 respectively. Any suitable hinging means may be used.

Figure 4:
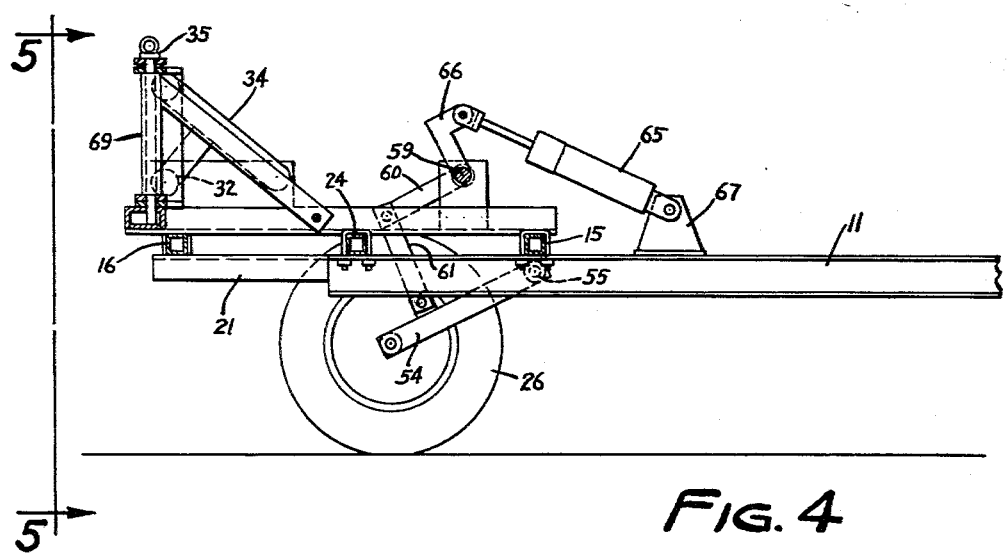
FIGURE 4 is a partial side elevation, partial longitudinal section taken on the line and in the direction of the arrows 4—4 of FIGURE 3 and drawn to the same scale as that figure; broken lines illustrate hidden parts.

In FIGURE 4, the leverage provided by cylinder 65 via lever 66, to shaft 58, arm 60 and link 61 is clearly evident. It will be noted in this figure, that extension of the cylinder 65 will cause the arm 54 to arc downwardly from its pivot point 55 and contraction will cause the left hand end of arm 54 as seen in FIGURE 4 to move upwardly.

FIGURE 5 shows clearly the tubular structure extending over to pivot point 35 and a bifurcated member 68 to which the tubes 32 and 34 are secured to form the vertical pivot support for the outboard or wing frame assembly 28. Between the ends of the bifurcated member 68 to which the tubes 32 and 34 are secured is a spacer tube 69 which may be integral with one of the hinge members that simply helps to stabilize the members on pivot point 35. Wing frame assembly 29 is seen to be provided with corresponding structure.

Figure 6:
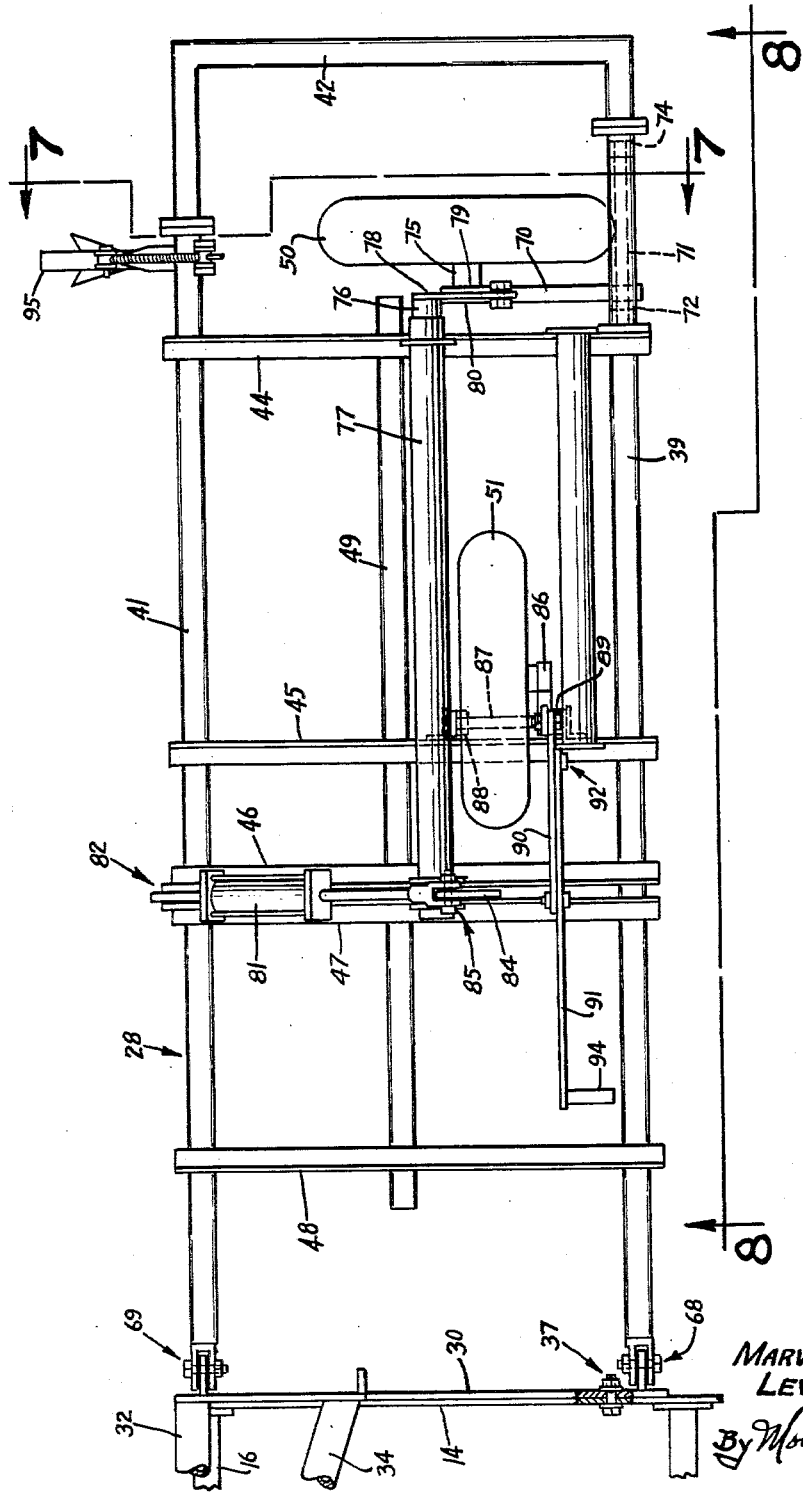
FIGURE 6 is an enlarged plan view of one of the wing frame members and a fragment of the central section; hidden portions are shown in broken lines; it is drawn to the same scale as FIGURES 3, 4, and 5.

In FIGURE 6 is an enlarged detailed view of the wheel structure for wing assembly 28. In this view, wheel 50 is seen to be supported on an arm 70 that is pivoted to the frame member 39 by means of a shaft 71 supported by the bearings 72 and 74. A wheel stub axle 75 is secured to the arm and supports rotatably the wheel 50. A shaft 76 is suitably pivoted to frame assembly 28 as by the tube 77 and an arm 78 is pivotally secured to the links 79 and 80 in the same way that the arm 60 is pivoted to the link 61 and link 62. Links 79 and 80 are pivoted to arm 70 thereby articulating these members together. Another fluid cylinder, this one designated 81, is secured to frame member 41 pivotally as at 82 and is also pivoted to an arm 84 by a suitable means such as the nut and bolt assembly 85. Arm 84 is rigidly attached to shaft 76. In the same manner as the wheels 26 and 27 and central frame assembly 10 is raised and lowered, therefore, the wheel 50 may be raised and lowered by the extension and contraction of cylinder 81. Identical structure is provided for the comparable wheel and frame assembly 29.

Figure 7:
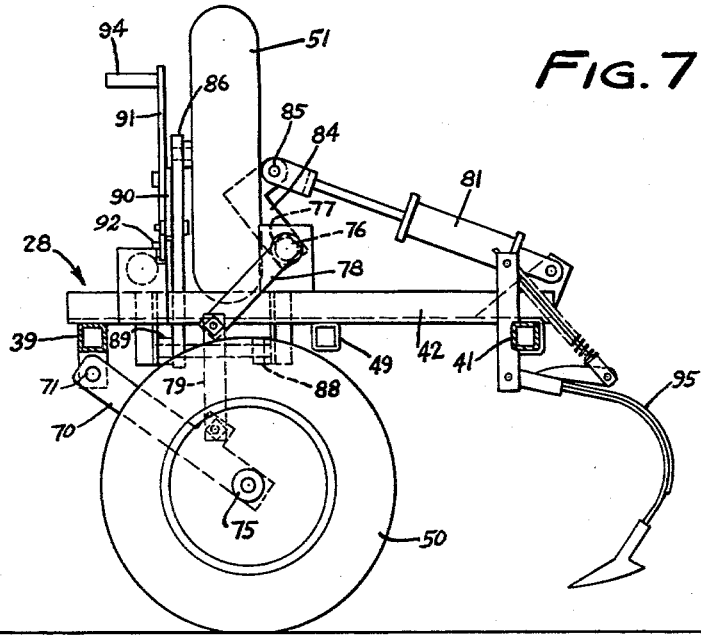
FIGURE 7 is a partial section, partial side elevation taken on the line 7—7 of FIGURE 6; broken lines illustrate hidden parts and the scale used is that of FIGURES 3, 4, 5 and 6.

Wheel 51 is rotatably mounted on a stub axle that is secured to an arm 86 which in turn is secured to a shaft 87 that is pivotally supported by the bearings 88 and 89 as seen best in FIGURE 7. The arm 86 is pivotally secured to a link 90 that in turn is pivoted to a manual control lever 91. Control lever 90 is pivoted as at 92 to the frame element 45. For this reason, when the handle 94 of lever 91 is grasped and moved in an arc toward the outer end 42 of the frame assembly 28, the link 90 engaged with the arm 86 causes the wheel 51 to move also in an arc to the position shown in broken lines in FIGURE 8.

In FIGURE 6 also, a single cultivator shoe 95 is shown to illustrate how agricultural implements of various types may be secured to the frame.

In FIGURE 7, the cultivator shoe 95 is shown in side elevation. In this view also, the articulation of the linkage between cylinder 81 and the pivoted arm 70 that supports wheel 50 is clearly shown.

FIGURE 8 shows clearly the linkage interacted between the wing frame assembly 28 and the wheel 51 to move it from an elevated to a lowered position for transport.

*Operation*

In order to place the device in the position shown in FIGURE 2, that is for transport over a highway or through a fence gate, and from the position shown in FIGURE 1, which is the manner in which the device is arranged for work in the field, the following procedure is carried out. The nut and bolt assemblies like the one 37 for the flanking or wing frame section 28 are removed and the tension member 38 and its frame 29 counterpart disconnected, at one end at least. The center section of frame 10 is then moved in the normal direction of use. The wing sections, no longer secured so as to extend straight laterally from frame 10, will not move forward as the center portion does. As a result, each of the two wing sections will pivot about the pivot point 35 until they are nearly in the position illustrated in FIGURE 2. During the arcing movement of these two wing sections, the wheel 50 and comparable wheel for wing section 29 will roll in a normal manner toward the rear of section 10. When they have nearly aligned themselves at the rear of section 10, however, the angle at which they are moving will be so steep as to almost preclude rolling with the forward motion of section 10.

At this point, cylinders for the outboard wheels such as 81 and its counterpart for wing section 29 are supplied with hydraulic fluid as to cause them to extend thereby lowering the wheels 50 and its counterpart for wing section 29 to their full down position. With the wing section frames elevated by this action of the hydraulic cylinders controlling the outboard wheels, the wheel 51 and its counterpart for wing section 29 may then be manually moved to the position illustrated by the broken lines in FIGURE 8. In order to hold the wheel 51 in this downward position, a suitable pin member or the like is inserted in the hole 96 in frame member 97 and it extends through a hole 98 in the bar 90. By this means, wheel 51 is now supported in the position shown by broken lines in FIGURE 8. The weight of the wing frame 28 is supported by both of the wheels 50 and 51. When wheel 51 has been secured as described above, the wheel 50 may then be retracted by placing hydraulic pressure in hydraulic cylinder 81 as to cause it to contract and thereby pivot the shaft 76 in a clockwise direction as viewed in FIGURE 7. This pivoting of shaft 76 will cause arm 78 to swing upwardly and lift links 79 and its corresponding link which will pivot arm 70 up and raise wheel 50. When wheel 50 has thus been raised and the counterparts for wheels 51 and 50 are likewise adjusted for frame 29, the weight of the two wing sections will then be supported by the wheels extending at right angles to their hydraulically controlled working wheels and the pivot point on frame 10. Thereafter, the towing vehicle may again be moved forward and the two wing sections will trail behind the center section 10. Thereafter, clamping member 53 is installed and the entire device is ready for transport.

In order to return the device to the extended position shown in FIGURE 1 for field work, commencing with the device in the position as shown in FIGURE 2, member 53 is removed and the towing vehicle backed. This causes the wing sections gradually to spread at the rear one toward each side. In order to assure this movement, some manual assistance may be necessary merely to make sure that the two units start moving in the proper direction. As soon as any substantial spreading of the two units has occurred, the wheel 51 and its counterpart for element 29 will begin to act as anchors as to rearward movement and the device very rapidly assumes the position shown in FIGURE 1. The wheel 51 and its wing frame 29 counterpart are always capable of allowing the wing sections to move outwardly with respect to the center section as the final stage of adjustment occurs. Once the end 30 and the counterpart thereof for wing section 29 engage the central frame section 10 and specifically the side members 12 and 14 thereof, the nut and bolt assembly 37 and its wing frame 29 counterpart are positioned and tightened. Tension members such as chain 38 and the like for flanking frame section 29 are placed in position. Thereafter, the wheel 50 and its section 29 counterpart are lowered hydraulically to relieve pressure on the pins such as the one extending through hole 96. As soon as the pressure has been relieved and their securing pins withdrawn from the wheel 51 and its frame section 29 counterpart, they may be lifted by moving the grasping handle 94 and swinging lever 91 to the position shown in solid lines in FIGURE 8. This raises wheel 51 up as shown and leaves the frame member supported on the hydraulically controlled wheels 50 and its counterpart for section 29. Thereafter, the elevation of the entire frame assembly may be adjusted by hydraulically controlling the cylinders until the agricultural implements secured to the frame are at the desired elevation with respect to the ground to be worked.

While the frame has been shown illustratively with the cultivator shoe 95 secured to it the frame may be used for any of the various types of agricultural cultivating instruments and the frame members themselves may be re-arranged or altered to adapt the basic concept of some different form of agricultural implement such as planters and the like. The cultivator shoe 95 has merely been shown to illustrate a manner in which the frame may be employed with agricultural implements for cultivating ground surface or otherwise planting or cultivating the ground.

Figure 9:
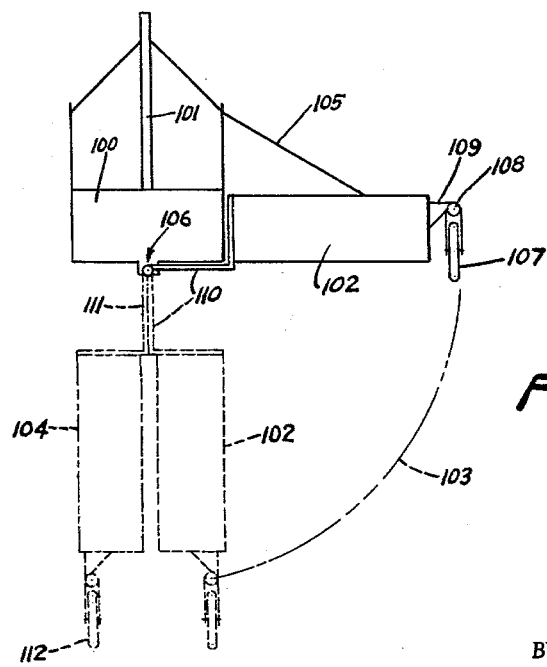
FIGURE 9 is a fragmentary, semi-diagrammatic plan view of a modified form of the invention.

In FIGURE 9, there is disclosed diagrammatically a modified form of the structure shown in FIGURES 1–8. The structure is very similar to the principal form of the invention shown in that it has a main frame element 100 with a draft tongue 101 secured thereto. There are also provided hinged wing assemblies such as the one shown in solid lines 102 which are similar to ones 28 and 29 of the structure shown in FIGURES 1–8. By means similar to those disclosed with respect to the form of the invention illustrated in detail in FIGURES 1–8, wing 102 may be held laterally at the side or main frame 100 as shown in the solid lines in FIGURE 9. The other wing section 104 is shown only in broken lines in the folded position. A suitable tension member as at 105 assists in holding the wing member 102 out in the position shown in solid lines.

This structure is distinguished from that shown in FIGURES 1–8 in that the pivot point 106 for wing frame member 102 is centered in the main frame 100 rather than being offset. The other principal variation is the use of wheels such as that shown at 107 which caster about a point 108 that is supported by a suitable bracket 109. When folding this form of structure, once the tension member 105 is released and any other locking members removed, the draft vehicle pulls main frame section 100 forward. Wheel 107 casters about point 108 as the frame member 102 swings backward in the arc represented by the irregularly broken line 103 to the position shown in broken lines in FIGURE 9. Note that in this form of the device, the hinge portion 110 of the frame wing member 102 is equal in length to that designated 111 for wing member 104 shown only in broken lines in the trailing position.

Wheel 107 and its counterpart 112 for wing member 104 may be controlled as to altitude by suitable structure comparable to that illustrated for the cylinder controlled wheels in FIGURES 1–8. The details of structure in the device of FIGURE 9 are similar to those illustrated in FIGURES 1–8, and accordingly the structure of FIGURE 9 is shown only diagrammatically to teach the broad concept of using the caster wheel instead of a pair of wheels for each wing member and also centering the pivot point 106 in the event that it is not necessary to have it off-center to accommodate agricultural implements to be used with the frame.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A frame for supporting agricultural implements comprising a central frame section of greater length than breadth and having a tongue extending forwardly from its forward end for attaching it to a draft vehicle, a pair of wheels pivotally secured near the rear and outer marginal edges of said central frame portion, power means secured to said central frame portion and said pivotally secured wheels for raising and lowering them, a pair of flanking frame members of substantially greater breadth than their front to rear extensions pivotally secured to the center rear of said central frame section, the means for pivotally securing them thereto being an extending arm of a length substantially equal to the distance from said point of pivotal connection to their respective sides of said central frame section, whereby said flanking frame members when pivoted from behind said central frame portion toward the front of said central frame section have their rears precisely aligned with the rear portion of said central frame section, means for securing the forward portion of each flanking frame member releasably to an intermediate side portion of said central frame section, tension means secured to said flanking frame members near their outboard ends and near the front of said central frame section, wheels near the outboard ends of said flanking frame members positioned to rotate on axes substantially parallel to the wheels of said central frame section, said flanking frame member wheels being pivotally secured to said flanking frame members, power means secured to said flanking frame members and the pivotal supports of said wheels for raising and lowering them selectively, and manually raised and lowered wheels on said flanking frame members near the front outboard portions thereof and positioned to rotate on axes at right angles to the outboard power controlled wheels of said flanking frame members.

2. The structure of claim 1 in which the portions of said flanking frame members pivoted and releasably secured to intermediate points on the sides of said central frame section are pivoted to the balance of said flanking frame members about a horizontal axis.

3. The structure of claim 1 in which said pivot point is nearer one side of said central frame section than the other.

4. A frame for supporting agricultural implements comprising a central frame assembly having a rear member, side members and a tongue extended forwardly from its forward end for attachment to a draft vehicle, wheel means pivotally secured near the outer marginal edges of said central frame assembly, power means secured to said central frame assembly and said wheel means for raising and lowering said wheel means, a pair of flanking frame assemblies, means pivotally attaching adjacent portions of said flanking frame assemblies to a central portion of the rear member of said central frame assembly, means for releasably securing the forward portions of each flanking frame assembly to said side members of said central frame assembly, second wheel means positioned adjacent the outboard ends of said flanking frame assemblies for rotation on axes substantially parallel to the first wheel means, means pivotally securing said second wheel means to said flanking frame assemblies and power means secured to said flanking frame assemblies and the pivotal means supporting said second wheel means for selectively raising and lowering said second wheel means.

5. A frame for agricultural implements comprising a central frame assembly having side members, a rear member and a tongue adapted to be secured to a draft vehicle, a pair of flanking frame assemblies, means pivotally attaching adjacent portions of said flanking frame assemblies to the mid-section of the rear member of said central frame assembly, and means for releasably securing front sections of said flanking frame assemblies to the side members of said central frame assembly in advance of said pivot means.

References Cited by the Examiner
UNITED STATES PATENTS

| | | | |
|---|---|---|---|
| 1,050,439 | 1/13 | Erdmann | 280—411 |
| 2,828,597 | 4/58 | Moore | 280—411 X |
| 2,900,031 | 8/59 | Sorenson et al. | 280—34 X |
| 2,995,385 | 8/61 | Lohrman et al. | 172—456 X |
| 2,996,307 | 8/61 | Debailleux | 280—34 |
| 3,062,562 | 11/62 | Van Horn | 172—456 X |
| 3,086,598 | 4/63 | Gellner | 280—411 X |

A. HARRY LEVY, *Primary Examiner.*
PHILIP ARNOLD, *Examiner.*